(12) United States Patent
Lee et al.

(10) Patent No.: US 7,302,640 B2
(45) Date of Patent: Nov. 27, 2007

(54) LANGUAGE INPUT ARCHITECTURE FOR CONVERTING ONE TEXT FORM TO ANOTHER TEXT FORM WITH TOLERANCE TO SPELLING, TYPOGRAPHICAL, AND CONVERSION ERRORS

(75) Inventors: Kai-Fu Lee, Woodinville, WA (US); Zheng Chen, Beijing (CN); Jian Han, Beijing (CN)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 10/970,438

(22) Filed: Oct. 21, 2004

(65) Prior Publication Data

US 2005/0086590 A1  Apr. 21, 2005

Related U.S. Application Data

(62) Division of application No. 09/606,660, filed on Jun. 28, 2000, now Pat. No. 6,848,080.

(60) Provisional application No. 60/163,902, filed on Nov. 5, 1999.

(51) Int. Cl.
*G06F 15/00* (2006.01)

(52) U.S. Cl. ...................... 715/533; 715/500; 715/535; 455/566

(58) Field of Classification Search ................ 715/500, 715/533, 535; 704/9; 341/22; 455/566
See application file for complete search history.

(56) References Cited

U.S. PATENT DOCUMENTS

| | | | |
|---|---|---|---|
| 4,383,307 A | 5/1983 | Gibson, III | |
| 4,833,610 A | 5/1989 | Zamora et al. | |
| 5,095,432 A | 3/1992 | Reed | |
| 5,175,803 A | 12/1992 | Yeh | |
| 5,214,583 A | 5/1993 | Miike et al. | |

(Continued)

FOREIGN PATENT DOCUMENTS

EP  0 555 545  12/1992

(Continued)

OTHER PUBLICATIONS

Camarda et al., "Entering Asian Text with Input Method Editors" Using Word 2000 Chapter 26.

(Continued)

*Primary Examiner*—Doug Hutton
*Assistant Examiner*—Quoc A. Tran
(74) *Attorney, Agent, or Firm*—Lee & Hayes, PLLC

(57) ABSTRACT

A language input architecture converts input strings of phonetic text to an output string of language text. The language input architecture has a search engine, typing models, a language model, and one or more lexicons for different languages. Each typing model is trained on real data, and learns probabilities of typing errors. The typing model is configured to generate a list of probable typing candidates that may be substituted for the input string based on probabilities of how likely each of the candidate strings was incorrectly entered as the input string. The language model provides probable conversion strings for each of the typing candidates based on probabilities of how likely a probable conversion output string represents the candidate string. The search engine combines the probabilities of the typing and language models to find the most probable conversion string that represents a converted form of the input string.

7 Claims, 8 Drawing Sheets

U.S. PATENT DOCUMENTS

| | | | |
|---|---|---|---|
| 5,218,536 A | 6/1993 | McWherter | |
| 5,258,909 A | 11/1993 | Damerau et al. | |
| 5,278,943 A | 1/1994 | Gasper et al. | |
| 5,319,552 A | 6/1994 | Zhong | |
| 5,510,998 A | 4/1996 | Woodruff et al. | |
| 5,521,816 A | 5/1996 | Roche et al. | |
| 5,535,119 A | 7/1996 | Ito et al. | |
| 5,572,423 A * | 11/1996 | Church | 715/533 |
| 5,594,642 A | 1/1997 | Collins et al. | |
| 5,646,840 A | 7/1997 | Yamauchi et al. | |
| 5,652,898 A | 7/1997 | Kaji | |
| 5,671,426 A | 9/1997 | Armstrong, III | |
| 5,704,007 A | 12/1997 | Cecys | |
| 5,715,469 A | 2/1998 | Arning | |
| 5,732,276 A | 3/1998 | Komatsu et al. | |
| 5,774,834 A | 6/1998 | Visser | |
| 5,781,884 A | 7/1998 | Pereira et al. | |
| 5,806,021 A | 9/1998 | Chen et al. | |
| 5,835,924 A * | 11/1998 | Maruyama et al. | 715/535 |
| 5,893,133 A | 4/1999 | Chen | |
| 5,907,705 A | 5/1999 | Carter | |
| 5,930,755 A | 7/1999 | Cecys | |
| 5,933,525 A | 8/1999 | Makhoul et al. | |
| 5,956,739 A | 9/1999 | Golding et al. | |
| 5,970,492 A | 10/1999 | Nielsen | |
| 5,974,371 A | 10/1999 | Hirai et al. | |
| 5,974,413 A | 10/1999 | Beauregard et al. | |
| 5,987,403 A | 11/1999 | Sugimura | |
| 6,047,300 A | 4/2000 | Walfish et al. | |
| 6,073,146 A | 6/2000 | Chen et al. | |
| 6,131,102 A | 10/2000 | Potter | |
| 6,148,285 A | 11/2000 | Busardo | |
| 6,154,758 A | 11/2000 | Chiang | |
| 6,173,252 B1 | 1/2001 | Qiu et al. | |
| 6,246,976 B1 | 6/2001 | Mukaigawa et al. | |
| 6,256,630 B1 | 7/2001 | Gilai et al. | |
| 6,356,866 B1 | 3/2002 | Pratley et al. | |
| 6,374,210 B1 | 4/2002 | Chu | |
| 6,487,533 B2 | 11/2002 | Hyde-Thomson et al. | |
| 6,490,563 B2 | 12/2002 | Hon et al. | |
| 6,573,844 B1 | 6/2003 | Venolia et al. | |
| 6,646,572 B1 | 11/2003 | Brand | |
| 6,848,080 B1 | 1/2005 | Lee et al. | |
| 7,047,493 B1 | 5/2006 | Brill et al. | |
| 7,076,731 B2 | 7/2006 | Brill et al. | |

FOREIGN PATENT DOCUMENTS

| | | |
|---|---|---|
| GB | 1158776 | 2/1984 |
| GB | 2158776 | 11/1985 |
| GB | 2248328 | 4/1992 |
| WO | WO 95/17729 | 6/1995 |
| WO | WO 00/10101 | 2/2000 |

OTHER PUBLICATIONS

Yuan et al., "A Neural Network for Disambiguating Pinyin Chinese Input" Calico '94 Annual Symposium Northern Arizona University Mar. 14-18, 1994 pp. 239-243.

Brill, et al., "An Improved Error Model for Noisy Channel Spelling Correction", p. 8.

Church, et al., "Probability scoring for spelling correction", Satistics and Computing, vol. 1, 1991, Chapman & Hall, pp. 93-104.

* cited by examiner

LANGUAGE INPUT ARCHITECTURE FOR CONVERTING ONE TEXT FORM TO ANOTHER TEXT FORM WITH TOLERANCE TO SPELLING, TYPOGRAPHICAL, AND CONVERSION ERRORS

RELATED CASES

This application claims priority to U.S. patent application Ser. No. 09/606,660, filed Jun. 28, 2000, which claims priority to U.S. Provisional Application No. 60/163,902, filed Nov. 5, 1999.

TECHNICAL FIELD

The invention relates to a language input method and system. More particularly, the invention provides language input method and system that has error tolerance for both typographical errors that occur during text entry and conversion errors that occur during conversion from one language form to another language form.

BACKGROUND

Language specific word processing software has existed for many years. More sophisticated word processors offer users advanced tools, such as spelling and grammar correction, to assist in drafting documents. Many word processors, for example, can identify words that are misspelled or sentence structures that are grammatically incorrect and, in some cases, automatically correct the identified errors.

Generally speaking, there are two causes for errors being introduced into a text. One cause is that the user simply does not know the correct spelling or sentence structure. Word processors can offer suggestions to aid the user in choosing a correct spelling or phraseology. The second and more typical cause of errors is that the user incorrectly enters the words or sentences into the computer, even though he/she knew the correct spelling or grammatical construction. In such situations, word processors are often quite useful at identifying the improperly entered character strings and correcting them to the intended word or phrase.

Entry errors are often more prevalent in word processors designed for languages that do not employ Roman characters. Language specific keyboards, such as the English version QWUERTY keyboards, do not exist for many languages because such languages have many more characters than can be conveniently arranged as keys in the keyboard. For example, many Asian languages contain thousands of characters. It is practically impossible to build a keyboard to support separate keys for so many different characters.

Rather than designing expensive language and dialect specific keyboards, language specific word processing systems allow the user to enter phonetic text from a small character-set keyboard (e.g., a QWUERTY keyboard) and convert that phonetic text to language text. "Phonetic text" represents the sounds made when speaking a given language, whereas the "language text" represents the actual written characters as they appear in the text. In the Chinese language, for example, Pinyin is an example of phonetic text and Hanzi is an example of the language text. By converting the phonetic text to language text, many different languages can be processed by the language specific word processor using conventional computers and standard QWUERTY keyboards.

Word processors that require phonetic entry thus experience two types of potential entry errors. One type of error is common typing mistakes.

However, event if the text is free of typographical errors, another type of error is that the word processing engine might incorrectly convert the phonetic text to an unintended character text. When both of these two problems are at work on the same phonetic text input string, a cascade of multiple errors may result. In some situations, the typing induced errors may not be readily traced without a lengthy investigation of the entire context of the phrase or sentence.

The invention described herein is directed primarily to the former type of entry errors made by the user when typing in the phonetic text, but also provide tolerance for conversion errors made by the word processing engine. To better demonstrate the problems associated with such typing errors, consider a Chinese-based word processor that converts the phonetic text, Pinyin, to a language text, Hanzi.

There are several reasons why entry of phonetic text often yields increased typing errors. One reason is that the average typing accuracy on an English keyboard is lower in China than in English-speaking countries. A second reason is that phonetic text is not used all that frequently. During earlier education years, users are not as prone to study and learn phonetic spelling as, for example, English-speaking users are taught to spell words in English.

A third reason for increased typing errors during phonetic text input is that many people speak natively in a regional dialect, as opposed to a standard dialect. The standard dialect, which is the origin of phonetic text, is a second language. In certain dialects and accents, spoken words may not match corresponding proper phonetic text, thus making it more difficult for a user to type phonetic text. For instance, many Chinese speak various Chinese dialects as their first language and are taught Mandarin Chinese, which is the origin of Pinyin, as a second language. In some Chinese dialects, for example, there is no differentiation in pronouncing "h" and "w" is certain contexts; in other dialects, the same can be said for "ng" and "n"; and yet in others, "r" is not articulated. As a result, a Chinese user who speaks Mandarin as a second language may be prone to typing errors when attempting to enter Pinyin.

Another possible reason for increased typing errors is that it is difficult to check for errors while typing phonetic text. This is due in part to the fact that phonetic text tends to be long, unreadable strings of characters that are difficult to read. In contrast to English-based text input, where what you see is what you typed, entered phonetic text is often not "what you see is what you get." Rather, the word processor converts the phonetic text to language text. As a result, users generally do not examine the phonetic text for errors, but rather wait until the phonetic text is converted to the language text.

For this last reason, a typing error can be exceptionally annoying in the context of Pinyin entry. Pinyin character strings are very difficult to review and correct because there is no spacing between characters. Instead, the Pinyin characters run together irregardless of the number of words being formed by the Pinyin characters. In addition, Pinyin-to-Hanzi conversion often does not occur immediately, but continues to formulate correct interpretations as additional Pinyin text is entered. Thus, if a user types in the wrong Pinyin symbols, the single error may be compounded by the conversion process and propagated downstream to cause several additional errors. As a result, error correction takes longer because by the time the system converts decisively to Hanzi characters and then the user realizes there has been an error, the user is forced to backspace several times just to make one correction. In some systems, the original error cannot even be revealed.

Since mistakes are expected to be made frequently during phonetic input, there is a need for a system that can tolerate errors in the phonetic input. It is desirable that the system would return the correct answer even though the phonetic string contains slightly erroneous characters.

Language specific word processors face another problem, separate from the entry problem, which concerns switching modes between two languages in order to input words from the different language into the same text. It is common, for example, to draft a document in Chinese that includes English words, such as technical terms (e.g., Internet) and terms that are difficult to translate (e.g., acronyms, symbols, surnames, company names, etc.). Conventional word processors require a user to switch modes from one language to the other language when entering the different words. Thus, when a user wants to enter a word from a different language, the user must stop thinking about text input, switch the mode from one language to another, enter the word, and then switch the mode back to the first language. This significantly reduces the user's typing speed and requires the user to shift his/her attention between the text input task and an extraneous control task of changing language modes.

Accordingly, there is a need for a "modeless" system that does not require mode switching. To avoid modes, the system should be able to detect the language that is being typed, and then convert the letter sequence to one language or the other, dynamically, on a word-by-word basis.

This is not as easy as it may seem, however, because many character strings may be appropriate in both contexts. For example, many valid English words are also valid Pinyin strings. Furthermore, more ambiguities may arise since there are no spaces between Chinese characters, and between Chinese and English words, during Pinyin input.

As an example, when a user types a string of Pinyin input text "woshiyigezhongguoren", the system converts this string into Chinese character: "我是一个中国人" (generally translated to "I am a Chinese").

Sometimes, instead of typing "woshiyigezhongguoren", a user types the following:

wosiyigezhongguoren (the error is the "sh" and "s" confusion);

woshiyigezongguoren (the error is the "zh" and "z" confusion);

woshiygezhongguoren (the error is the "i" omission after "y");

woshiyigezhonggouren (the error is the "ou" juxtaposition);

woshiyigezhongguiren (the error is the "i" and "o" confusion).

The inventors have developed a word processing system and method that makes spell correction feasible for difficult foreign languages, such as Chinese, and allows modeless entry of multiple languages through automatic language recognition.

SUMMARY

A language input architecture converts input strings of phonetic text (e.g., Chinese Pinyin) to an output string of language text (e.g., Chinese Hanzi) in a manner that minimizes typographical errors and conversion errors that occur during conversion from the phonetic text to the language text. The language input architecture may be implemented in a wide variety of areas, including word processing programs, email programs, spreadsheets, browsers, and the like.

In one implementation, the language input architecture has a user interface to receive in input string of characters, symbols, or other text elements. The input string may include phonetic text and non-phonetic text, as well as one or more languages. The user interface allows the user to enter the input text string in a single edit line without switching modes between entry of different text forms or different languages. In this manner, the language input architecture offers modeless entry of multiple languages for user convenience.

The language input architecture also has a search engine, one or more typing models, a language model, and one or more lexicons for different languages. The search engine receives the input string from the user interface and distributes the input string to the one or more typing models. Each typing model is configured to generate a list of probable typing candidates that may be substituted for the input string based on typing error probabilities of how likely each of the candidate strings was incorrectly entered as the input string. The probable typing candidates may be stored in a database.

The typing model is trained from data collected from many trainers who enter a training text. For instance, in the context of the Chinese language, the trainers enter a training text written in Pinyin. The observed errors made during entry of the training text are used to compute the probabilities associated with the typing candidates that may be used to correct the typing error. Where multiple typing models are employed, each typing model may be trained in a different language.

In one implementation, the typing model may be trained by reading strings of input text and mapping syllables to corresponding typed letters of each string. A frequency count expressing the number of times each typed letter is mapped to one of the syllables is kept and the probability of typing for each syllable is computed from the frequency count.

The typing model returns a set of probable typing candidates that account for possible typographical errors that exist in the input string. The typing candidates are written in the same language or text form as the input string.

The search engine passes the typing candidates to the language model, which provides probable conversion strings for each of the typing candidates. More particularly, the language model is a trigram language model that attempts to determine a language text probability of how likely a probable conversion output string represents the candidate string based on two previous textual elements. The conversion string is written in a different language or different text form than the input string. For example, the input string might comprise Chinese Pinyin or other phonetic text and the output string might comprise Chinese Hanzi or other language text.

Based upon the probabilities derived in the typing and language models, the search engine selects the associated typing candidate and conversion candidate that exhibits the highest probability. The search engine converts the input string (e.g., written in phonetic text) to an output string consisting of the conversion candidate returned from the language model so that the entered text form (e.g., phonetic text) is replaced with another text form (e.g., language text). In this manner, any entry error made by the user during entry of the phonetic text is eliminated.

Where multiple languages are used, the output string may have a combination of the conversion candidate as well as portions of the input string (without conversion). An example of this latter case is where the Chinese-based language input architecture outputs both converted Pinyin-to-Hanzi text along with non-converted English text.

The user interface displays the output string in the same edit line that continues to be used for entry of the input string. In this manner, the conversion is taking place automatically and concurrently with the user entering additional text.

BRIEF DESCRIPTION OF THE DRAWINGS

The same numbers are used throughout the Figures to reference like components and features.

DETAILED DESCRIPTION

The invention pertains to a language input system and method that converts one form of a language (e.g., phonetic version) to another form of the language (e.g., written version). The system and method have error tolerance for spelling and typographical errors that occur during text entry and conversion errors that occur during conversion from one language form to another language form. For discussion purposes, the invention is described in the general context of word processing programs executed by a general-purpose computer. However, the invention may be implemented in many different environments other than word processing and may be practiced on many diverse types of devices. Other contexts might include email programs, spreadsheets, browsers, and the like.

The language input system employs a statistical language model to achieve very high accuracy. In one exemplary implementation, the language input architecture uses statistical language modeling with automatic, maximum-likelihood-based methods to segment words, select a lexicon, filter training data, and derive a best possible conversion candidate.

Statistical sentence-based language modeling assumes, however, that a user's input is perfect. In reality, there are many typing and spelling errors in the user's input. Accordingly, the language input architecture includes one or more typing models that utilize probabilistic spelling models to accept correct typing while tolerating common typing and spelling errors. The typing models may be trained for multiple languages, such as English and Chinese, to discern how likely the input sequence is a word in one language as opposed to another language. Both models can run in parallel and are guided by the language model (e.g., a Chinese language model) to output the most likely sequence of characters (i.e., English and Chinese characters).

Exemplary Computer System

Figure 1:
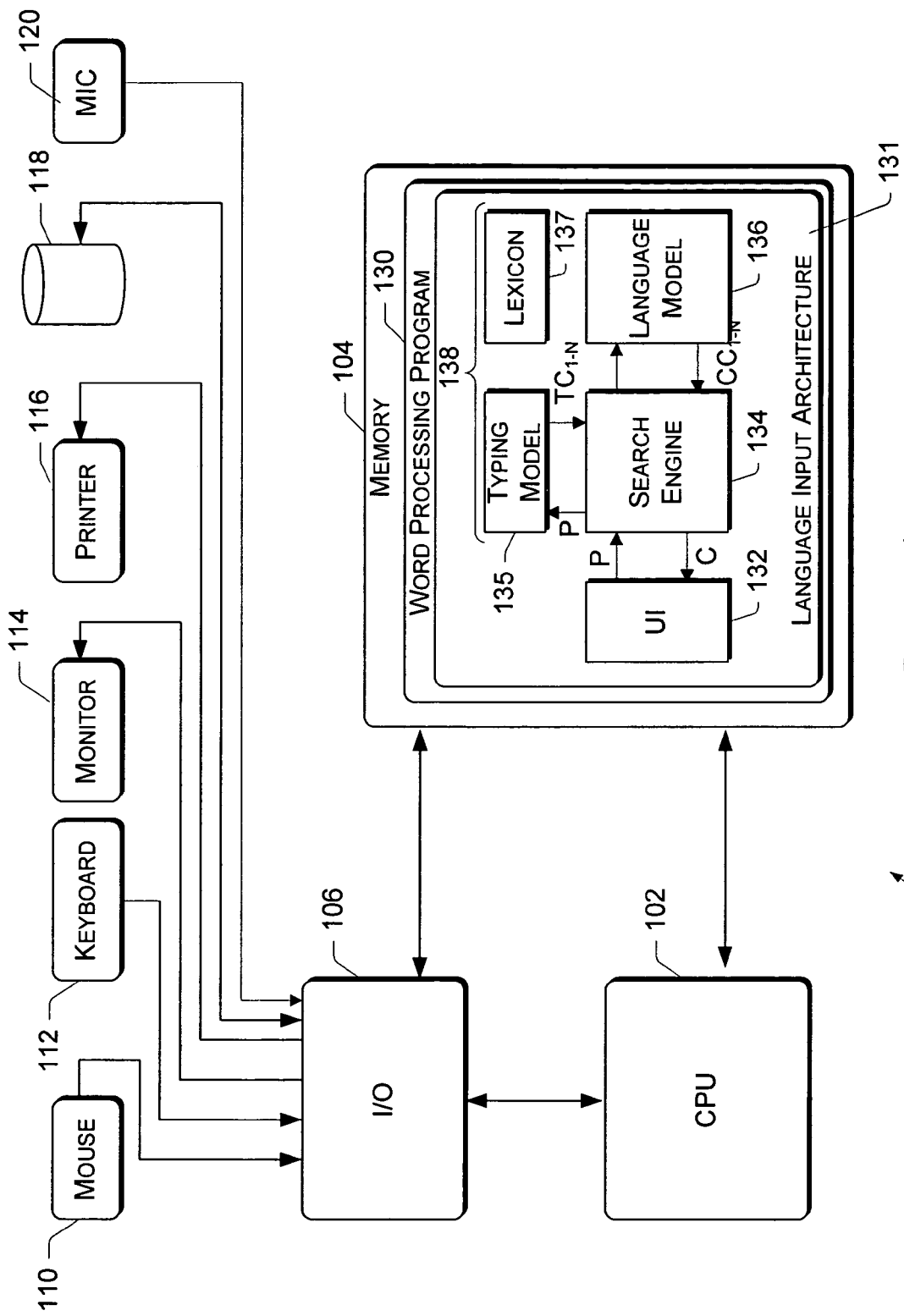
FIG. 1 is a block diagram of a computer system having a language-specific word processor that implements a language input architecture.

FIG. 1 shows an exemplary computer system 100 having a central processing unit (CPU) 102, a memory 104, and an input/output (I/O) interface 106. The CPU 102 communicates with the memory 104 and I/O interface 106. The memory 104 is representative of both volatile memory (e.g., RAM) and non-volatile memory (e.g., ROM, hard disk, etc.).

The computer system 100 has one or more peripheral devices connected via the I/O interface 106. Exemplary peripheral devices include a mouse 110, a keyboard 112 (e.g., an alphanumeric QUERY keyboard, a phonetic keyboard, etc.), a display monitor 114, a printer 116, a peripheral storage device 118, and a microphone 120. The computer system may be implemented, for example, as a general-purpose computer. Accordingly, the computer system 100 implements a computer operating system (not shown) that is stored in memory 104 and executed on the CPU 102. The operating system is preferably a multi-tasking operating system that supports a windowing environment. An example of a suitable operating system is a Windows brand operating system from Microsoft Corporation.

It is noted that other computer system configurations may be used, such as hand-held devices, multiprocessor systems, microprocessor-based or programmable consumer electronics, network PCs, minicomputers, mainframe computers, and the like. In addition, although a standalone computer is illustrated in FIG. 1, the language input system may be practiced in distributed computing environments where tasks are performed by remote processing devices that are linked through a communications network (e.g., LAN, Internet, etc.). In a distributed computing environment, program modules may be located in both local and remote memory storage devices.

A data or word processing program 130 is stored in memory 104 and executed on CPU 102. Other programs, data, files, and such may also be stored in memory 104, but are not shown for ease of discussion. The word processing program 130 is configured to receive phonetic text and convert it automatically to language text. More particularly, the word processing program 130 implements a language input architecture 131 that, for discussion purposes, is implemented as computer software stored in memory and executable on a processor. The word processing program 130 may include other components in addition to the architecture 131, but such components are considered standard to word processing programs and will not be shown or described in detail.

The language input architecture 131 of word processing program 130 has a user interface (UI) 132, a search engine 134, one or more typing models 135, a language model 136, and one or more lexicons 137 for various languages. The architecture 131 is language independent. The UI 132 and search engine 134 are generic and can be used for any language. The architecture 131 is adapted to a particular language by changing the language model 136, the typing model 135 and the lexicon 137.

The search engine 134 and language module 136 together form a phonetic text-to-language text converter 138. With the assistance of typing model 135, the converter 138 becomes tolerant to user typing and spelling errors. For purposes of this disclosure, "text" means one or more characters and/or non-character symbols. "Phonetic text" generally refers to an alphanumeric text representing sounds made when speaking a given language. A "language text" is the characters and non-character symbols representative of a written language. "Non-phonetic text" is alphanumeric text that does not represent sounds made when speaking a given language. Non-phonetic text might include punctuation, special symbols, and alphanumeric text representative of a written language other than the language text.

Perhaps more generally stated, phonetic text may be any alphanumeric text represented in a Roman-based character set (e.g., English alphabet) that represents sounds made when speaking a given language that, when written, does not employ the Roman-based character set. Language text is the written symbols corresponding to the given language.

For discussion purposes, word processor 130 is described in the context of a Chinese-based word processor and the language input architecture 131 is configured to convert Pinyin to Hanzi. That is, the phonetic text is Pinyin and the language text is Hanzi. However, the language input architecture is language independent and may be used for other languages. For example, the phonetic text may be a form of spoken Japanese, whereas the language text is representative of a Japanese written language, such as Kanji. Many other examples exist including, but not limited to, Arabic languages, Korean language, Indian language, other Asian languages, and so forth.

Phonetic text is entered via one or more of the peripheral input devices, such as the mouse 110, keyboard 112, or microphone 120. In this manner, a user is permitted to input phonetic text using keyed entry or oral speech. In the case of oral input, the computer system may further implement a speech recognition module (not shown) to receive the spoken words and convert them to phonetic text. The following discussion assumes that entry of text via keyboard 112 is performed on a full size, standard alphanumeric QWUERTY keyboard.

The UI 132 displays the phonetic text as it is being entered. The UI is preferably a graphical user interface.

A more detailed discussion of the UI 132 is found in co-pending application Ser. No. 09/606,811, entitled "LANGUAGE INPUT USER INTERFACE," which is incorporated herein by reference.

The user interface 132 passes the phonetic text (P) to the search engine 134, which in turn passes the phonetic text to the typing model 137. The typing model 137 generates various typing candidates ($TC_1, \ldots, TC_N$) that might be suitable edits of the phonetic text intended by the user, given that the phonetic text may include errors. The typing model 137 returns multiple typing candidates with reasonable probabilities to the search engine 134, which passes the typing candidates onto the language model 136. The language model 136 evaluates the typing candidates within the context of the ongoing sentence and generates various conversion candidates ($CC_1, \ldots, CC_N$) written in the language text that might be representative of a converted form of the phonetic text intended by the user. The conversion candidates are associated with the typing candidates.

Conversion from phonetic text to language text is not a one-for-one conversion. The same or similar phonetic text might represent a number of characters or symbols in the language text. Thus, the context of the phonetic text is interpreted before conversion to language text. On the other hand, conversion of non-phonetic text will typically be a direct one-to-one conversion wherein the alphanumeric text displayed is the same as the alphanumeric input.

The conversion candidates ($CC_1, \ldots, CC_N$) are passed back to the search engine 134, which performs statistical analysis to determine which of the typing and conversion candidates exhibit the highest probability of being intended by the user. Once the probabilities are computed, the search engine 134 selects the candidate with the highest probability and returns the language text of the conversion candidate to the UI 132. The UI 132 then replaces the phonetic text with the language text of the conversion candidate in the same line of the display. Meanwhile, newly entered phonetic text continues to be displayed in the line ahead of the newly inserted language text.

If the user wishes to change language text from the one selected by the search engine 134, the user interface 132 presents a first list of other high probability candidates ranked in order of the likelihood that the choice is actually the intended answer. If the user is still dissatisfied with the possible candidates, the UI 132 presents a second list that offers all possible choices. The second list may be ranked in terms of probability or other metric (e.g., stroke count or complexity in Chinese characters).

Language Input Architecture

Figure 2:
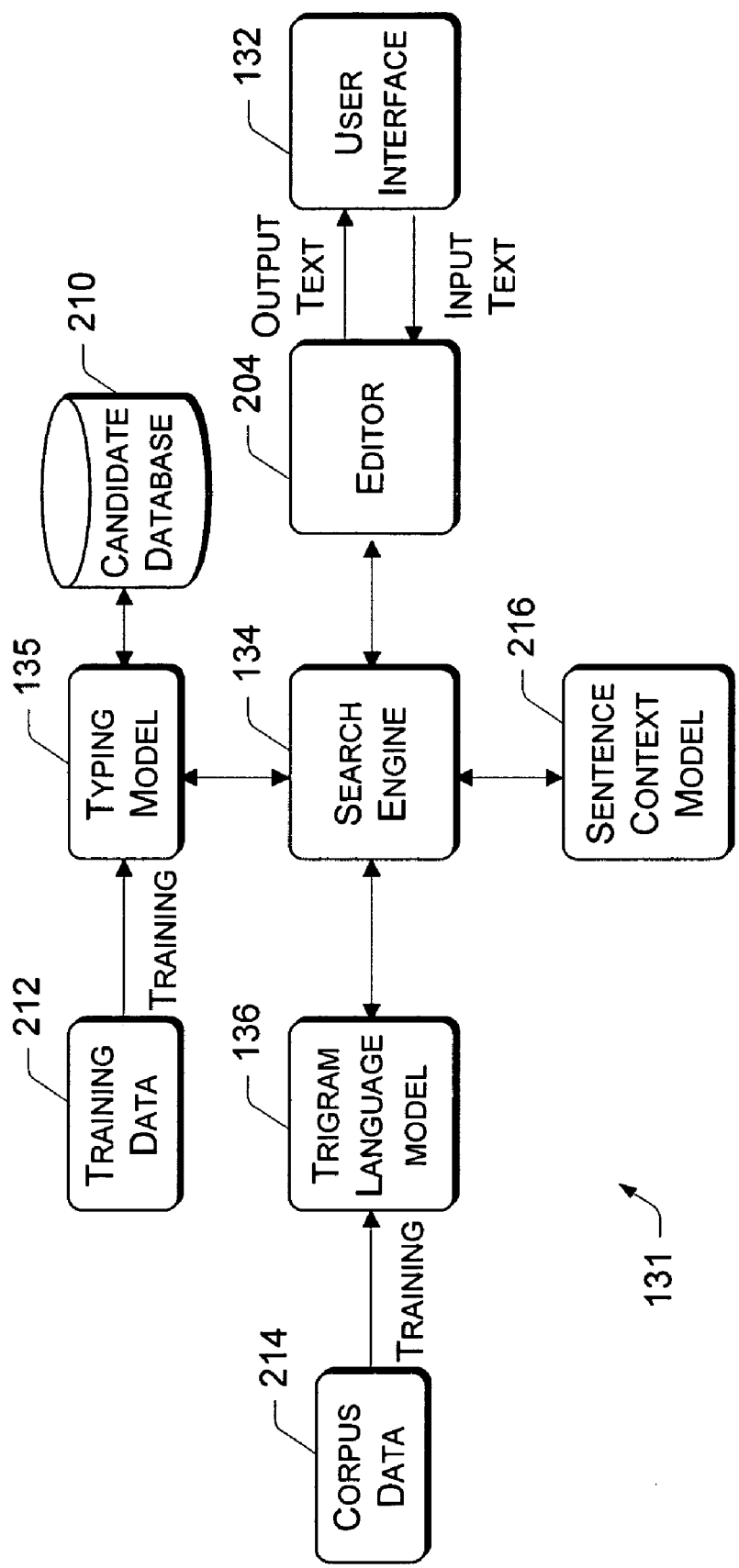
FIG. 2 is a block diagram of one exemplary implementation of the language input architecture.

FIG. 2 illustrates the language input architecture 131 in more detail. The architecture 131 supports error tolerance for language input, including both typographical errors and conversion errors. In addition to the UI 132, search engine 134, language model 136, and typing model 135, the architecture 131 further includes an editor 204 and a sentence context model 216. A sentence context model 216 is coupled to the search engine 134.

The user interface 132 receives input text, such as phonetic text (e.g. Chinese Pinyin text) and non-phonetic text (e.g., English), from one or more peripheral devices (e.g., keyboard, mouse, microphone) and passes the input text to the editor 204. The editor 204 requests that the search engine 132, in conjunction with the typing model 135 and language model 136, convert the input text into an output text, such as a language text (e.g. Chinese Hanzi text). The editor 204 passes the output text back to the UI 132 for display.

Upon receiving a string of input text from the user interface 132, the search engine 134 sends the string of input text to one or more of the typing models 135 and to the sentence context model 216. The typing model 135 measures a priori probability of typing errors in the input text. The typing model 135 generates and outputs probable typing candidates for the input text entered by the user, effectively seeking to cure entry errors (e.g., typographical errors). In one implementation, the typing model 135 looks up potential candidates in a candidate database 210. In another implementation, the typing model 135 uses statistical-based modeling to generate probable candidates for the input text.

The sentence context model 216 may optionally send any previously input text in the sentence to the search engine 132 to be used by the typing model 135. In this manner, the typing model may generate probable typing candidates based on a combination of the new string of text and the string of text previously input in the sentence.

It is appreciated that the terms "typing errors", "typographical errors", and "spelling errors" may be interchangeable to refer to the errors made during keyed entry of the input text. In the case of verbal entry, such errors may result from improper recognition of the vocal input.

The typing model 135 may return all of the probable typing candidates or prune off the probable typing candidates with lower probability, thereby returning only the probable typing candidates with higher probability back to the search engine 134. It will also be appreciated that the search engine 134, rather than the typing model 135, can perform the pruning function.

According to one aspect of the invention, the typing model 135 is trained using real data 212 collected from hundreds or thousands of trainers that are asked to type in sentences in order to observe common typographical mistakes. The typing model and training are described below in more detail under the heading "Training the Typing Model."

The search engine 134 sends the list of probable typing candidates returned from the typing model 135 to the language model 136. Simplistically, a language model measures the likelihood of words or text strings within a given context, such as a phrase or sentence. That is, a language model can take any sequence of items (words, characters, letters, etc.) and estimate the probability of the sequence. The language model 136 combines the probable typing candidates from the search engine 134 with the previous text and generates one or more candidates of language text corresponding to the typing candidates.

Corpus data or other types of data 214 are used to train the trigram language model 136. The training corpus 214 may be any type of general data, such as everyday text such as news articles or the like, or environment-specific data, such as text directed to a specific field (e.g., medicine). Training the language model 136 is known in the word processing art and is not described in detail.

The language input architecture 131 tolerates errors made during entry of an input text string and attempts to return the most likely words and sentences given the input string. The language model 136 helps the typing model 135 to determine which sentence is most reasonable for the input string entered by the user. The two models can be described statistically as the probability that an entered string s is a recognizable and valid word w from a dictionary, or P(w|s). Using Bayes formula, the probability P(w|s) is described as:

$$P(w\mid s) = \frac{P(s\mid w)\cdot P(w)}{P(s)}$$

The denominator P(s) remains the same for purposes of comparing possible intended words given the entered string. Accordingly, the analysis concerns only the numerator product P(s|w)·P(w), where the probability P(s|w) represents the spelling or typing model and the probability P(w) represents the language model. More specifically, the typing model P(s|w) describes how likely a person intending to input X will instead input Y; whereas, the language model P(w) describes how likely a particular word given the sentence context is to have been generated.

In the context of converting Pinyin to Hanzi, the probability P(w|s) can be restated as P(H|P), where H represents a Hanzi string and P represents a Pinyin string. The goal is to find the most probable Chinese character H', so as to maximize P(H|P). Thus, the probability P(H|P) is the likelihood that an entered Pinyin string P is a valid Hanzi string H. Since P is fixed and hence P(P) is a constant for a given Pinyin string, Bayes formula reduces the probability P(H|P), as follows:

$H'$=arg max$H$ $P(H|P)$=arg max$H$ $P(P|H)*P(H)$

The probability P(P|H) represents the spelling or typing model. Usually, the Hanzi string H can be further decomposed into multiple words $W_1, W_2, W_3, \ldots, W_M$, and the probability P(P|H) can be estimated as:

$Pr(P|H) \approx \Pi P(P_{f(i)}|W_i)$ where $P_{f(i)}$ is the sequence of Pinyin characters that correspond to the word $W_i$.

In prior art statistically-based Pinyin-to-Hanzi conversion systems, the probability $P(P_{f(i)}|W_i)$ is set to 1 if $P_{f(i)}$ is an acceptable spelling of word $W_i$ and is set to 0 if $P_{f(i)}$ is not an acceptable spelling of word $W_i$. As a result, conventional systems provide no tolerance for any erroneously entered characters. Some systems have the "southern confused pronunciation" feature to deal with this problem, alghough this also employs the preset values probabilities of 1 and 0. In addition, such systems only address a small fraction of typing errors because it is not data-driven (learned from real typing errors).

In contrast, the language architecture described herein utilizes both the typing model and the language model to carry out a conversion. The typing model enables error tolerance to erroneously input characters by training the probability of $P(P_{f(i)}|W_i)$ from a real corpus. There are many ways to build typing models. In theory, all possible $P(P_{f(i)}|W_i)$ can be trained; but in practice, there are too many parameters. To reduce the number of parameters that need to be trained, one approach is to consider only single-character words and map all characters with equivalent pronunciation into a single syllable. In the Chinese language, there are approximately 406 syllables, so this is essentially training P(Pinyin text|syllable), and then mapping each character to its corresponding syllable. This is described below in more detail beneath the heading "Training the Typing Model".

With the language architecture 131, a wide range of probabilities is computed. One goal of Pinyin-to-Hanzi conversion is to find the Hanzi string H that maximizes the probability P(P|H). This is accomplished by selecting the $W_i$ that yields the largest probability as the best Hanzi sequence. In practice, efficient searches like the well-known Viterbi Beam search may be used. For more information on the Viterbi Beam search, the reader is directed to an article by Kai-Fu Lee, entitled "Automatic Speech Recognition", Kluwer Academic Publishers, 1989, and to writings by Chin-Hui Lee, Frank K. Soong, Kuldip K. Paliwal, entitled "Automatic Speech and Speaker Recognition—Advanced Topics", Kluwer Academic Publishers, 1996.

The probability P(H) represents the language model, which measures the a priori probability of any given string of words. A common approach to building a statistical language model is to utilize a prefix tree-like data structure to build an N-gram language model from a known training set of text. One example of a widely used statistical language model is the N-gram Markov model, which is described in "Statistical Methods for Speech Recognition", by Frederick Jelinek, The MIT Press, Cambridge, Mass., 1997. The use of a prefix tree data structure (a.k.a. a suffix tree, or a PAT tree) enables a higher-level application to quickly traverse the language model, providing the substantially real-time performance characteristics described above. The N-gram language model counts the number of occurrences of a particular item (word, character, etc.) in a string (of size N) throughout a text. The counts are used to calculate the probability of the use of the item strings.

The language model 136 is preferably a trigram language model (i.e., an N-gram where N=3), although a bigram may be suitable in some contexts. Trigram language models are suitable for English and also work well for Chinese, assuming it utilizes a large training corpus.

Figure 3:
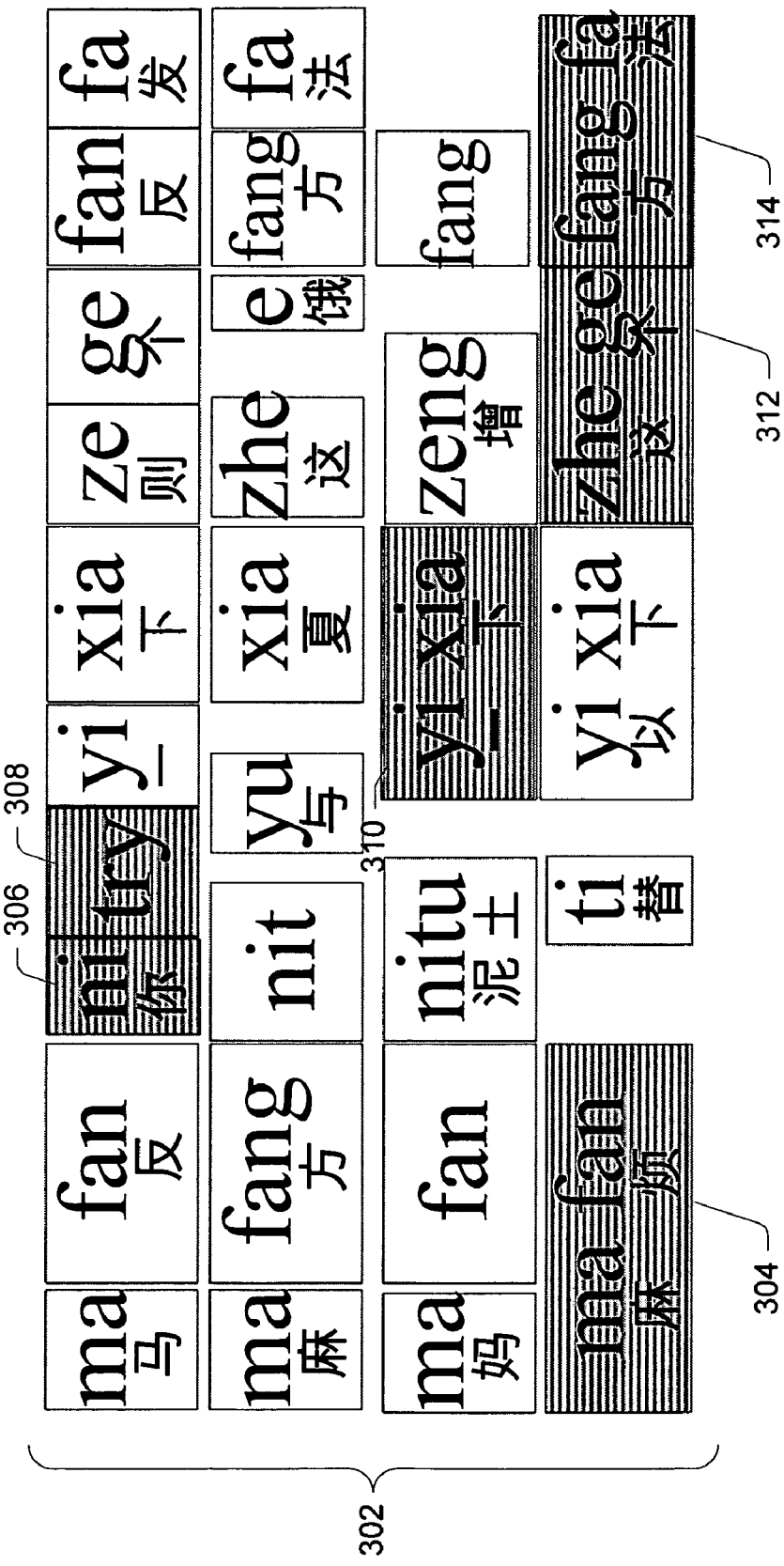
FIG. 3 is a diagrammatic illustration of a text string that is parsed or segmented into different sets of syllables, and candidates that may be used to replace those syllables assuming the text string contains errors.

A trigram model considers the two most previous characters in a text string to predict the next character, as follows:

(a) characters (C) are segmented into discrete language text or words (W) using a pre-defined lexicon, wherein each W is mapped in the tree to one or more C's;

(b) predict the probability of a sequence of words ($W_1$, $W_2$, ... $W_M$) from the previous two words:

$$P(W_1, W_2, W_3, \ldots W_M) \approx \Pi P(W_n | W_{n-1}, W_{n-2}) \quad (1)$$

where P( ) represents the probability of the language text;
$W_n$ is the current word
$W_{n-1}$ is the previous word
$W_{n-2}$ is the word previous to $W_{n-1}$ FIG. 3 illustrates an example of input text 300 that is input by a user and passed to the typing model 135 and the language model 136. Upon receiving the input text 300, the typing model 135 segments the input text 300 in different ways to generate a list of probable typing candidates 302 that take into account possible typographical errors made during keyboard entry. The typing candidates 302 have different segmentations in each time frame such that the end-time of a previous word is a start-time of a current word. For instance, the top row of candidates 302 segments the input string 300 "mafangnitryyis . . . " as "ma", "fan", "ni", "try", "yi", and so on. The second row of typing candidate 302 segments the input string "mafangnitryyis . . . " differently as "ma", "fang", "nit", "yu", "xia", and so on.

The candidates may be stored in a database, or some other accessible memory. It will be appreciated that FIG. 3 is merely one example, and that there might be a different number of probable typing candidates for the input text.

The language model 136 evaluates each segment of probable typing candidates 302 in the context of the sentence and generates associated language text. For illustration purposes, each segment of the probable typing text 302 and the corresponding probable language text are grouped in boxes.

From the candidates, the search engine 134 performs statistical analysis to determine which of the candidates exhibit the highest probability of being intended by the user. The typing candidates in each row have no relation to one another, so the search engine is free to select various segments from any row to define acceptable conversion candidates. In the example of FIG. 3, the search engine has determined that the highlighted typing candidates 304, 306, 308, 310, 312, and 314 exhibit the highest probability. These candidates may be concatenated from left to right so that candidate 304 is followed by candidate 306, and so on, to form an acceptable interpretation of the input text 300.

Once the probabilities are computed, the search engine 134 selects the candidate with the highest probability. The search engine then converts the input phonetic text to the language text associated with the selected candidate. For instance, the search engine converts the input text 300 to the language text illustrated in boxes 304, 306, 308, 310, 312, and 314 and returns the language text to the user interface 132 via the editor 204. Once punctuation is received at the user interface, i.e. a new string of input text is in a new sentence, the typing model 135 begins operating on the new string of text in the new sentence.

General Conversion

Figure 4:
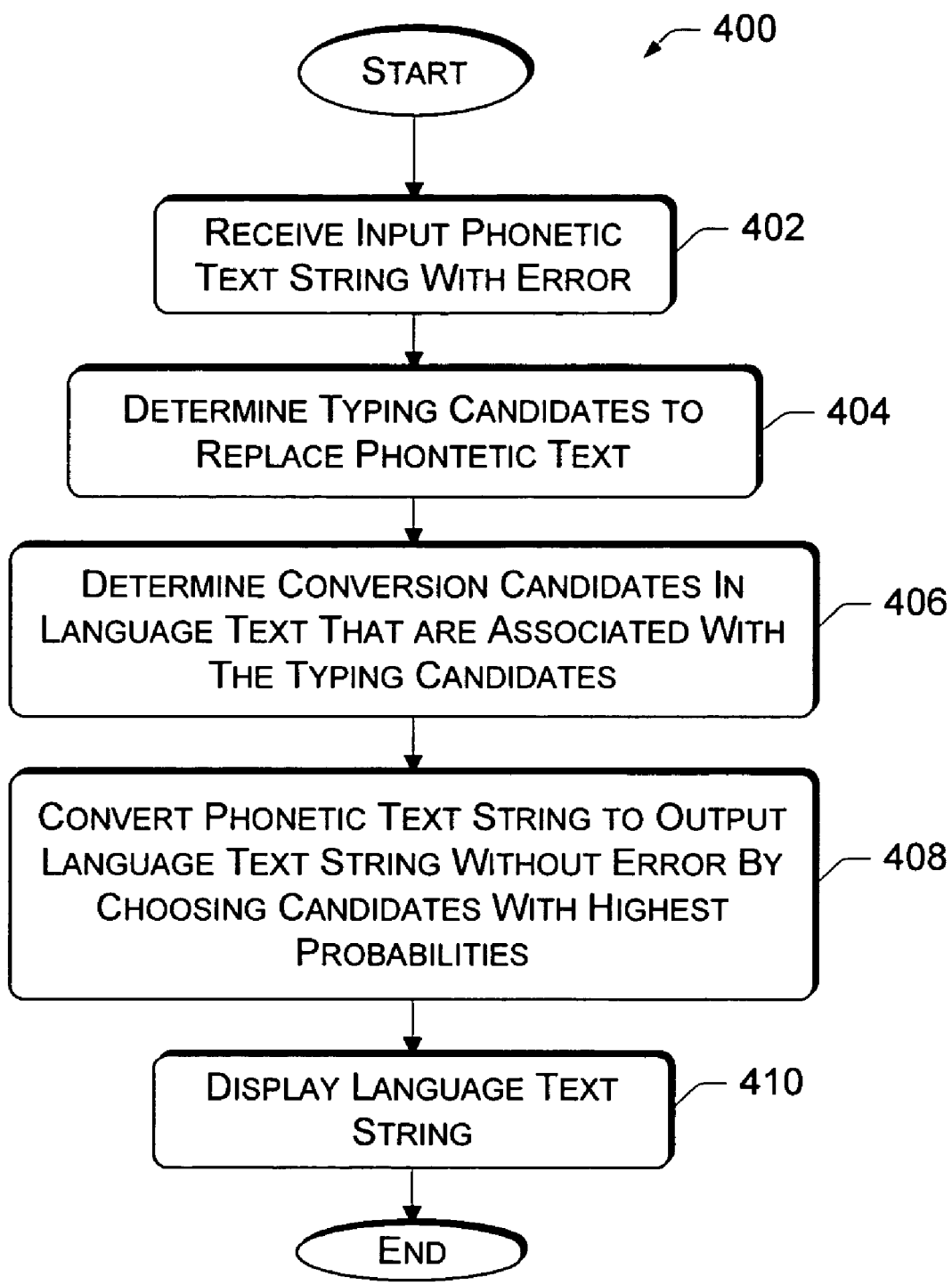
FIG. 4 is a flow diagram illustrating a general conversion operation performed by the language input architecture.

FIG. 4 illustrates a general process 400 of converting phonetic text (e.g., Pinyin) into language text (e.g., Hanzi). The process is implemented by the language input architecture 131, and is described with additional reference to FIG. 2.

At step 402, the user interface 132 receives a phonetic text string, such as Pinyin, entered by the user. The input text string contains one or more typographical errors. The UI 132 passes the input text via the editor 204 to the search engine 134, which distributes the input text to the typing model 135 and the sentence context model 216.

At step 404, the typing model 135 generates probable typing candidates based on the input text. One way to derive the candidates is to segment the input text string in different partitions and look up candidates in a database that most closely resemble the input string segment. For instance, in FIG. 3, candidate 302 has a segmentation that dictates possible segments "ma", "fan", and so forth.

The probable typing candidates are returned to the search engine 134, which in turn conveys them to the language model 136. The language model 136 combines the probable typing candidates with the previous text and generates one or more candidates of language text corresponding to the typing candidates. With reference to candidate 302 in FIG. 3, for example, the language model returns the language text in boxes 302a-j as possible output text.

At step 406, the search engine 134 performs statistical analysis to determine which of the candidates exhibit the highest probability of being intended by the user. Upon selecting the most probable typing candidate for the phonetic text, the search engine converts the input phonetic text to the language text associated with the typing candidate. In this manner, any entry error made by the user during entry of the phonetic text is eliminated. The search engine 134 returns the error-free language text to the UI 132 via the editor 204. At step 408, the converted language text is displayed at the UI 132 in the same in-line position on the screen that the user is continuing to enter phonetic text.

Training the Typing Model

As noted above, the typing model 135 is based on the probability P(s|w). The typing model computes probabilities for different typing candidates that can be used to convert the input text to the output text and selects probable candidates. In this manner, the typing model tolerates errors by returning the probable typing candidates for the input text even though typing errors are present.

One aspect of this invention concerns training the typing model P(s|w) from real data. The typing model is developed or trained on text input by as many trainers as possible, such as hundreds or preferably thousands. The trainers enter the same or different training data and any variance between the entered and training data is captured as typing errors. The goal is to get them to type the same training text and determine the probabilities based on the numbers of errors or typing candidates in their typing. In this way, the typing model learns probabilities of trainers' typing errors.

Figure 5:
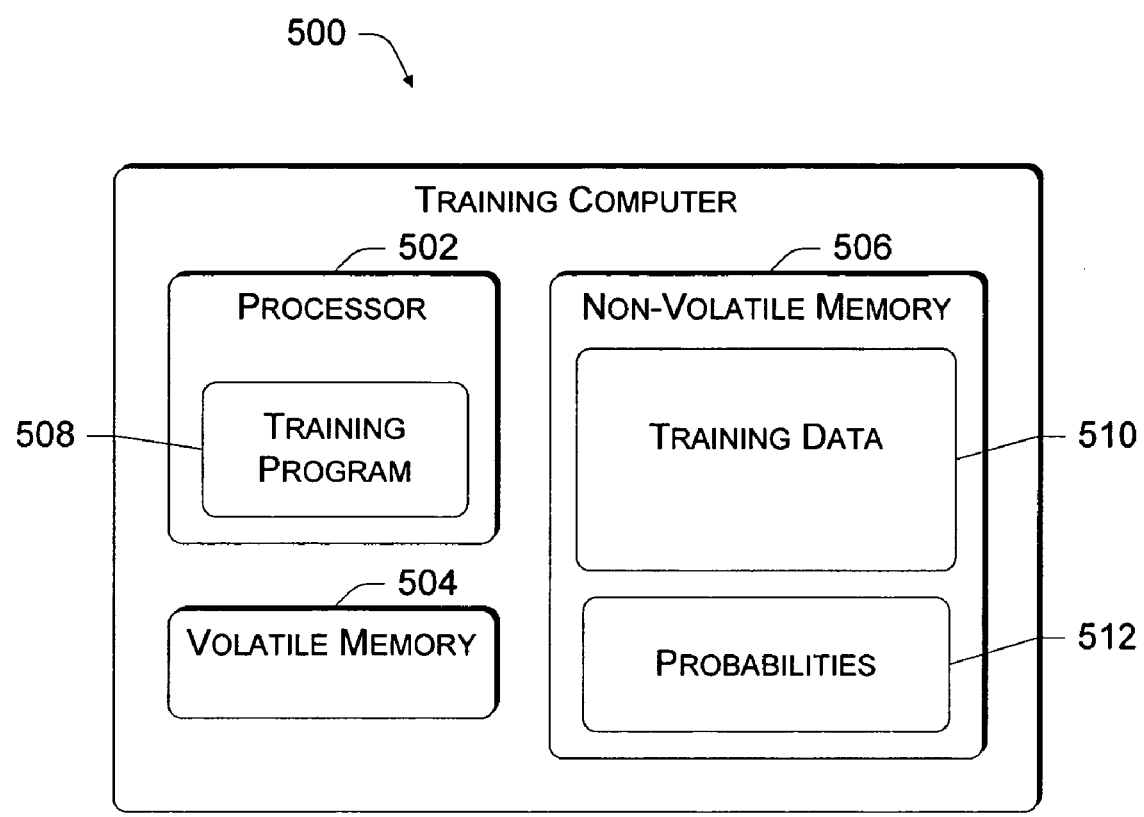
FIG. 5 is a block diagram of a training computer used to train probability-based models employed in the language input architecture.

FIG. 5 shows a training computer 500 having a processor 502, a volatile memory 504, and a non-volatile memory 506. The training computer 500 runs a training program 508 to produce probabilities 512 (i.e., P(s|w)) from data 510 entered by users. The training program 508 is illustrated as executing on the processor 502, although it is loaded into the processor from storage on non-volatile memory 506. Training computer 500 may be configured to train on data 510 as it is entered on the fly, or after it is collected and stored in memory.

For purposes of discussion, consider a typing model tailored for the Chinese language, wherein Chinese Pinyin text is converted to Chinese character text. In this case, several thousands of people are invited to input Pinyin text. Preferably, several hundred sentences or more are collected from each person, with the goal of getting them to make similar types and numbers of errors in their typing. The typing model is configured to receive Pinyin text from the search engine, and provide probable candidates that may be used to replace characters in the input string.

Various techniques can be used to train the typing model 135. In one approach, the typing model is trained directly by considering a single character text and mapping all equivalently pronounced character text to a single syllable. For example, there are over four hundred syllables in Chinese Pinyin. The probability of phonetic text given a syllable (e.g. P(Pinyin text|syllable)) is trained and then each character text is mapped to its corresponding syllable.

Figure 6:
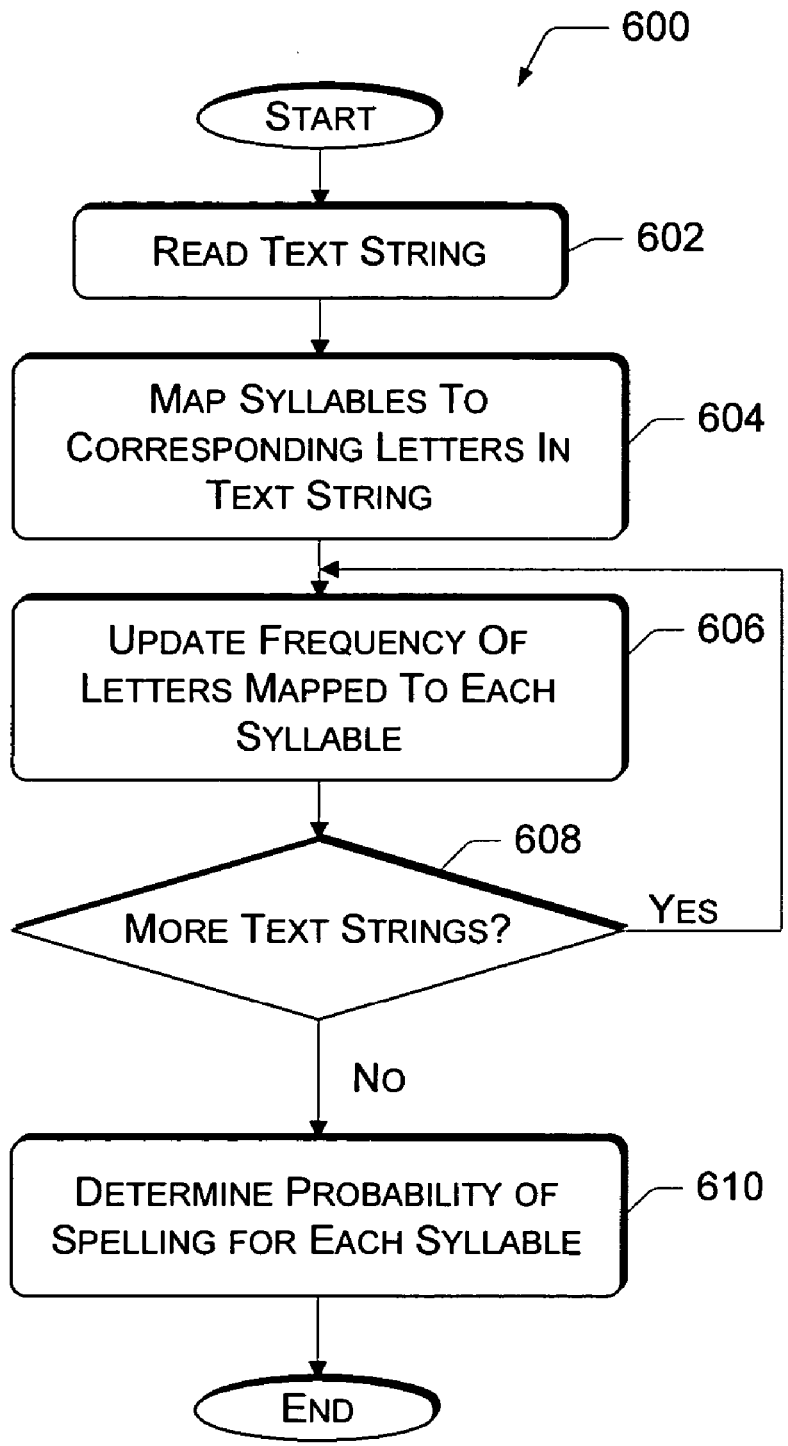
FIG. 6 is a flow diagram illustrating one training technique.

FIG. 6 shows the syllable mapping training technique 600. At step 602, the training program 508 reads a string of text entered by trainer. The text string may be a sentence or some other grouping of words and/or characters. The program 508 aligns or maps syllables to corresponding letters in the string of text (step 604). For each text string, the frequency of letters mapped to each syllable is updated (step 606). This is repeated for each text string contained in the training data entered by the trainers, as represented by the "Yes" branch from step 608. Eventually, the entered text strings will represent many or all syllables in Chinese Pinyin. Once all strings are read, as represented by the "No" branch from step 608, the training program determines the probability P(Pinyin text|syllable) of a user typing each syllable (step 610). In one implementation, the probability of typing is determined by first normalizing all syllables.

Each syllable can be represented as a hidden Markov model (HMM). Each input key can be viewed as a sequence of states mapped in HMM. The correct input and actual input are aligned to determine a transition probability between states. Different HMMs can be used to model typists with different skill levels.

To train all 406 syllables in Chinese, a large amount of data is needed. To reduce this data requirement, the same letter in different syllables is tied as one state. This reduces the number of states to 27 (i.e., 26 different letters from 'a' to 'z', plus one to represent an unknown letter). This model could be integrated into a Viterbi beam search that utilizes a trigram language model.

In yet another training technique, training is based on the probability of single letter edits, such as insertion of a letter (i.e., Ø→x), deletion of a letter (i.e., x→Ø), and substitution of one letter for another (x→y). The probability of such single letter edits can be represented statistically as:

Substitution: P(x replaced by y)
Insertion: P(x inserted before/after y)
Deletion: P(x deleted before/after y).

Each probability (P) is essentially a bigram typing model, but could also be extended to a N-gram typing model that considers a much broader context of text beyond adjacent characters. Accordingly, for any possible string of input text, the typing model has a probability of generating every possible letter sequence—by first providing the correct letter sequence, and then using dynamic programming to determine a lowest-cost path to convert the correct letter sequence to the given letter sequence. Cost may be determined as the minimal number of error characters, or some other measure. In practice, this error model can be implemented as a part of the Viterbi Beam searching method.

It will be appreciated that any other types of errors, other than the typing errors or spelling errors, can be trained within the scope of the invention. Also, it will be appreciated that different training techniques can be used to train a typing model without departing from the scope of the present invention.

Multilingual Training for Modeless Entry

Another annoying problem that plagues language input systems is the requirement to switch among modes when entering two or more languages. For instance, a user who is typing in Chinese may wish to enter an English word. Traditional input systems require the user to switch modes between typing English words and Chinese words. Unfortunately, it is easy for users to forget to switch.

The language input architecture 131 (FIG. 1) can be trained to accept mixed-language input, and hence eliminate mode shifting between two or more languages in a multilingual word processing system. This is referred to as "modeless entry".

The language input architecture implements a spelling/typing model that automatically distinguishes between words of different languages, such as discerning which word is Chinese and which word is English. This is not easy because many legal English words are also legal Pinyin strings. Additionally, since there are no spaces between Pinyin, English and Chinese characters, more ambiguities can arise during entry. Using Bayes rule:

$$H' = \arg\max_H P(H|P) = \arg\max_H P(P|H) * P(H)$$

the objective function may be characterized in two parts: a spelling model P(P|H) for English and a language model P(H) for Chinese.

One way to handle mixed-language input is to train the language model for a first language (e.g., Chinese) by treating words from a second language (e.g., English) as a special category of the first language. For instance, the words from the second language are treated as single words in the first language.

By way of example, suppose a Chinese-based word processing system uses an English keyboard as an input device. The typing model employed in the Chinese-based word processing system is a Chinese language model that is trained on text having a mixture of English words and Chinese words.

A second way to handle mixed-language input is to implement two typing models in the language input architecture, a Chinese typing model and an English typing model, and train each one separately. That is, the Chinese typing model is trained a stream of keyboard input, such as phonetic strings, entered by trainers in the manner described above, and the English typing model is trained on English text entered by English-speaking trainers.

The English typing model may be implemented as a combination of:
1. A unigram language model trained on real English inserted in Chinese language texts. This model can handle many frequently used English words, but it cannot predict an unseen English words.
2. An English spelling model of tri-syllable probabilities. This model should has non-zero probabilities for every 3-syllable sequence, but also generates a higher probability for words that are likely to be English-like. This can be trained from real English words also, and can handle unseen English words.

These English models generally return very high probabilities for English text, high probabilities for letter strings that look like English text, and low probabilities for non-English text.

Figure 7:
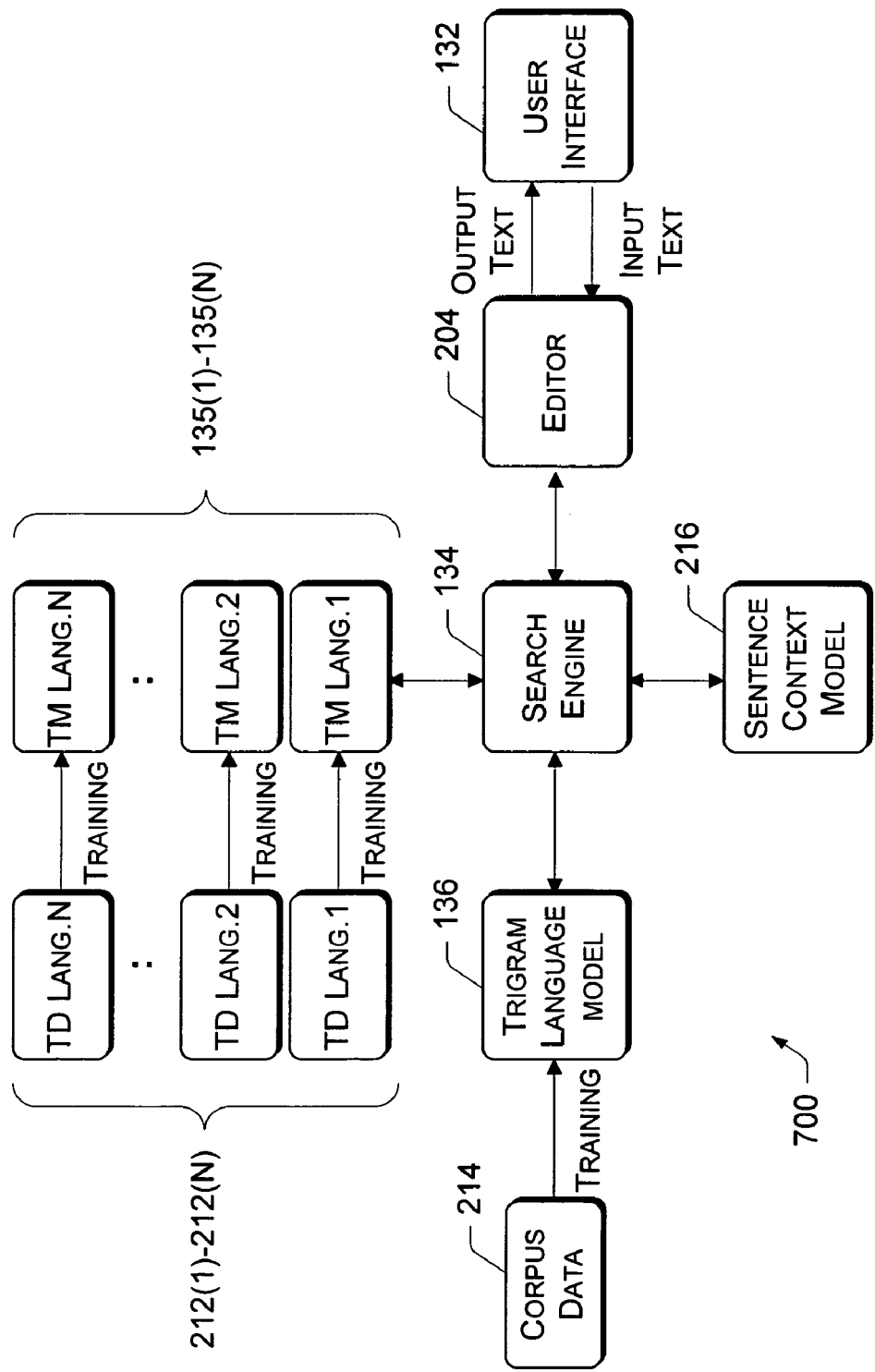
FIG. 7 is a block diagram of another exemplary implementation of the language input architecture, in which multiple typing models are employed.

FIG. 7 illustrates a language input architecture 700 that is modified from the architecture 131 in FIG. 2 to employ multiple typing models 135(1)-135(N). Each typing model is configured for a specific language. Each typing model 135 is trained separately using words and errors common to the specific language. Accordingly, separate training data 212(1)-212(N) is supplied for associated typing models 135(1)-135(N). In the exemplary case, only two typing models are used: one for English and one for Chinese. However, it should be appreciated that the language input architecture may be modified to include more than two typing models to accommodate entry of more than two languages. It should also be noted that the language input architecture may be used in many other types of multilingual word processing systems, such as Japanese, Korean, French, German, and the like.

During operation of the language input architecture, the English typing model operates in parallel with the Chinese typing model. The two typing models compete with one another to discern whether the input text is English or Chinese by computing probabilities that the entered text string is likely to be a Chinese string (including errors) or an English string (also potentially including errors).

When a string or sequence of input text is clearly Chinese Pinyin text, the Chinese typing model returns a much higher probability than the English typing model. Thus, the language input architecture converts the input Pinyin text to the Hanzi text. When a string or sequence of input text is clearly English (e.g., a surname, acronym ("IEEE"), company name ("Microsoft"), technology ("INTERNET"), etc.), the English typing model exhibits a much higher probability than the Chinese typing model. Hence, the architecture converts the input text to English text based on the English typing model.

When a string or sequence of input text is ambiguous, the Chinese and English typing models continue to compute probabilities until further context lends more information to disambiguate between Chinese and English. When a string or sequence of input text is not like either Chinese or English, the Chinese typing model is less tolerant than the English typing model. As a result, the English typing model has a higher probability than the Chinese typing model.

To illustrate a multi-language conversion, suppose a user inputs a text string "woaiduinternetzazhi", which means "I love to read INTERNET magazines". Upon receiving the initial string "woaidu", the Chinese typing model yields a higher probability than the English typing model and converts that portion of the input text to "INTERNET 我爱读". The architecture continues to find the subsequently typed portion "interne" ambiguous until letter "t" is typed. At this point, the English typing model returns a higher probability for "INTERNET" than the Chinese typing model and the language input architecture converts this portion of the input text to "INTERNET". Next, the Chinese typing model exhibits a higher probability for "zazhi" than the English typing model and the language input architecture converts that portion of the input text to "杂志".

Multi-Language Input Conversion

Figure 8:
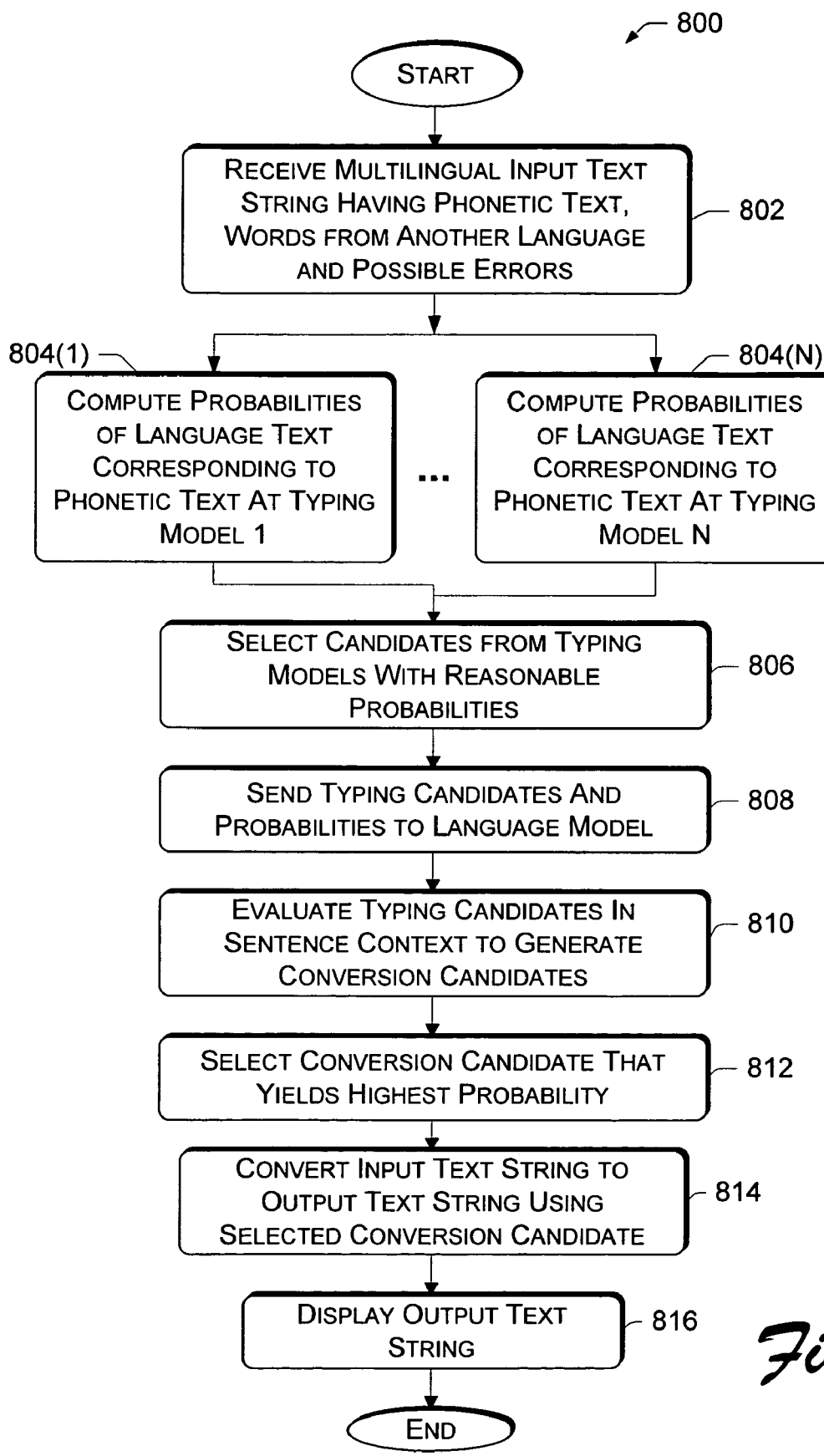
FIG. 8 is a flow diagram illustrating a multilingual conversion process.

FIG. 8 illustrates a process 800 of converting a multilingual input text string entered with typographical errors into a multilingual output text string that is free of errors. The process is implemented by the language input architecture 700, and is described with additional reference to FIG. 7.

At step 802, the user interface 132 receives the multilingual input text string. It contains phonetic words (e.g., Pinyin) and words of at least one other language (e.g., English). The input text may also include typographical errors made by the user when entering the phonetic words and second language words. The UI 132 passes the multilingual input text string via the editor 204 to the search engine 134, which distributes the input text to the typing models 135(1)-135(N) and the sentence context model 216.

Each of the typing models generates probable typing candidates based on the input text, as represented by steps 804(1)-804(N). At step 806, the probable typing candidates that possess reasonable probabilities are returned to the search engine 134. At step 808, the search engine 134 sends the typing candidates with typing probabilities to the language model 136. At step 810, the language model combines the probable typing candidates with the previous text to provide sentence-based context and generates one or more conversion candidates of language text corresponding to the typing candidates by selecting a path through the typing candidates, as described above with respect to FIG. 3. At step 812, the search engine 134 performs statistical analysis to select the conversion candidates that exhibit the highest probability of being intended by the user.

At step 814, the most probable conversion candidate for the text string is converted into the output text string. The output text string includes language text (e.g., Hanzi) and the second language (e.g., English), but omits the typing errors. The search engine 134 returns the error-free output text to the UI 132 via the editor 204. At step 816, the converted language text is displayed at the UI 132 in the same in-line position on the screen that the user is continuing to enter phonetic text.

In the above example, Chinese language is the primary language and English is the secondary language. It will be appreciated that the two languages can both be designated primary languages. Moreover, more than two languages may form the mixed input text string.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method facilitating text form conversion comprising:
   constructing one or more typing model(s);
   training the one or more typing model(s) to determine probabilities that a user intended to enter an intended string when an input string was entered, wherein the one or more typing models are trained using more than one language, wherein entry of the input string is facilitated via modeless entry and comprises more than one language, wherein modeless entry facilitates automatically distinguishing between words of different languages, wherein text elements of the input string are divided into syllables in each of the trained languages and equivalently pronounced text elements of the input strirpg are mapped to the same syllables, then the syllables are mapped to characters, and wherein the training is based on data collected from multiple users entering at least one training text; and
   storing, on a storage media, the one or more typing model(s) after the training.

2. A method as recited in claim 1, wherein the training comprises:
   maintaining a frequency count of the text elements of the input string mapping onto each of the syllables; and
   determining probabilities that the syllables represent correct entry of the input string based on the frequency counts of the text elements of the input string.

3. One or more computer-readable media having computer-executable instructions that, when executed on a processor, direct a computer to perfonn the method as recited in claim 1.

4. A method of training one or more typing model(s), comprising:

reading a text string having multiple letters input by a user via a modeless entry, wherein modeless entry facilitates automatically distinguishing between words of different languages;

mapping syllables from more than one language to corresponding groups of letters in the text string;

mapping equivalently pronounced groups of letters in the text string to the same syllables;

maintaining a frequency count of the groups of letters in the text string mapping onto each of the syllables in each of the more than one languages;

determining probabilities that the syllables represent correct entry of the text string based on the frequency counts of the group of letters in the text string;

mapping the syllables to characters; and storing, on a storage media, the one or more typing model(s) after training.

5. A method as recited in claim 4, wherein the text string comprises phonetic text.

6. A method as recited in claim 4, wherein the text string comprises a mixture of phonetic text and non-phonetic text.

7. One or more computer-readable media having computer-executable instructions that, when executed on a processor, direct a computer to perform the method as recited in claim 4.

* * * * *